(12) United States Patent
Kwon et al.

(10) Patent No.: US 8,868,120 B2
(45) Date of Patent: Oct. 21, 2014

(54) ACCESS POINT FOR ASSIGNING GROUP ID AND METHOD OF ASSIGNING GROUP ID

(75) Inventors: Ui Kun Kwon, Hwseong-si (KR); Young Soo Kim, Seoul (KR); Osama Aboul Magd, Kanata (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 13/288,184

(22) Filed: Nov. 3, 2011

(65) Prior Publication Data

US 2012/0142391 A1 Jun. 7, 2012

(30) Foreign Application Priority Data

Dec. 1, 2010 (KR) ........................ 10-2010-0121549

(51) Int. Cl.
*H04B 7/00* (2006.01)
*H04W 48/16* (2009.01)
*H04W 52/02* (2009.01)
*H04W 4/08* (2009.01)
*H04L 27/26* (2006.01)
*H04W 88/08* (2009.01)
*H04W 48/08* (2009.01)
*H04W 8/26* (2009.01)

(52) U.S. Cl.
CPC ......... *H04W 52/028* (2013.01); *H04L 27/2613* (2013.01); *H04W 88/08* (2013.01); *H04W 48/08* (2013.01); *H04W 8/26* (2013.01); *H04W 4/08* (2013.01)
USPC ......... 455/515; 455/519; 455/434; 455/67.11

(58) Field of Classification Search
CPC ............................. H04W 4/08; H04W 72/048
USPC ............. 455/509, 517, 518, 519, 452.1, 515, 455/434, 456.1, 456.3, 414.2, 500, 520, 455/67.11; 370/329, 344
See application file for complete search history.

(56) References Cited

U.S. PATENT DOCUMENTS

| | | | |
|---|---|---|---|
| 2005/0047384 A1 | 3/2005 | Wax et al. | |
| 2006/0164969 A1* | 7/2006 | Malik et al. | 370/203 |
| 2007/0223423 A1 | 9/2007 | Kim et al. | |
| 2008/0159425 A1 | 7/2008 | Khojastepour et al. | |
| 2009/0290546 A1 | 11/2009 | Lim et al. | |
| 2011/0021232 A1* | 1/2011 | Kazmi et al. | 455/509 |
| 2013/0058273 A1* | 3/2013 | Wentink et al. | 370/328 |

FOREIGN PATENT DOCUMENTS

| | | |
|---|---|---|
| KR | 10-2005-0074295 A | 7/2005 |
| KR | 10-0818630 B1 | 3/2008 |
| KR | 10-2009-0023879 | 3/2009 |

(Continued)

OTHER PUBLICATIONS

European Search Report issued Sep. 17, 2012 in counterpart European Patent Application No. 11191241.6 (15 pages, in English).

Joonsuk Kim et al. "Group IS Concept for Downlink MU-MIMO Transmission," IEEE 802.11-10/0073r0, Jan. 18, 2010, XP-002652701 (4 pages, in English).

(Continued)

*Primary Examiner* — John J Lee
(74) *Attorney, Agent, or Firm* — NSIP Law

(57) ABSTRACT

Provided is an access point that may transmit information about a data receiving terminal that receives data from the access point, to a terminal, using a limited number of bits. Using an overloading scheme, information about multiple terminals may be expressed based on a limited number of bits.

18 Claims, 10 Drawing Sheets

(56) References Cited

FOREIGN PATENT DOCUMENTS

| WO | WO 2004/088934 A2 | 10/2004 |
|----|-------------------|---------|
| WO | WO 2007/144688 A1 | 12/2007 |
| WO | WO 2009/116913 A1 | 9/2009  |

OTHER PUBLICATIONS

Partial European Search Report issued May 3, 2012 in counterpart European Patent Application No. EP 11191241.6 (5 pages, in English).

* cited by examiner

|  | A | B | C | D | E | F |
|---|---|---|---|---|---|---|
| FIRST GROUP ID | 1 | 1 | 2 | 2 | 3 | 4 |
| SECOND GROUP ID | 1 | 2 | 3 | 3 | 4 | 4 |

FIG. 4B

|  | 1 | 2 | 3 | 4 |
|---|---|---|---|---|
| FIRST GROUP ID | A, B | C, D | E | F |
| SECOND GROUP ID | A | B | C, D | E, F |

FIG. 5A

|  | A | B | C | D | E | F |
|---|---|---|---|---|---|---|
| FIRST GROUP ID | 1 | 2 | 3 | 3 | 4 | 4 |
| SECOND GROUP ID | 1 | 1 | 2 | 3 | 4 | 4 |
| THIRD GROUP ID | 1 | 1 | 2 | 2 | 3 | 4 |
| FOURTH GROUP ID | 1 | 2 | 2 | 3 | 3 | 4 |

FIG. 5B

|  | 1 | 2 | 3 | 4 |
|---|---|---|---|---|
| FIRST GROUP ID | A | B | C, D | E, F |
| SECOND GROUP ID | A, B | C | D | E, F |
| THIRD GROUP ID | A, B | C, D | E | F |
| FOURTH GROUP ID | A | B, C | D, E | F |

US 8,868,120 B2

ACCESS POINT FOR ASSIGNING GROUP ID AND METHOD OF ASSIGNING GROUP ID

CROSS-REFERENCE TO RELATED APPLICATION(S)

This application claims the benefit under 35 U.S.C. §119(a) of Korean Patent Application No. 10-2010-0121549, filed on Dec. 1, 2010, in the Korean Intellectual Property Office, the entire disclosure of which is incorporated herein by reference for all purposes.

BACKGROUND

1. Field

The following description relates to an apparatus and method for assigning an identification (ID) to a terminal group, and additionally, to an access point for assigning an ID to a terminal group that includes terminals that are within a coverage area, and a method of assigning an ID to a terminal group by the access point.

2. Description of Related Art

An access point may simultaneously transmit data to a plurality of terminals, for example, using a multi-user multiple-input multiple-output (MU-MIMO) transmission scheme. Data transmission efficiency may be enhanced by using the MU-MIMO technology. Accordingly, the MU-MIMO technology is being used more frequently.

SUMMARY

In one general aspect, there is provided an access point including a terminal group generation unit to generate at least one terminal group in which a plurality of terminals located within a coverage area of the access point are aligned based on a sequence, a conditional probability calculating unit to calculate a conditional probability of a terminal being present in the sequence of the at least one terminal group, with respect to each of the plurality of terminals, and a group identification (ID) assigning unit to assign the plurality of terminals to a plurality of group IDs, based on the calculated conditional probability, The group IDs may be included in a plurality of group ID sets, and a group ID set that has a greatest number of terminal groups from among the plurality of group ID sets may be assigned to the plurality of terminals.

The access point may further comprise a transmitting unit to transmit a group ID included in the assigned group ID set, to the terminals, and to transmit data to the terminals based on the group ID.

The access point may include a plurality of transmission antennas, and the transmitting unit may transmit a plurality of data streams to terminals that are included in terminal groups corresponding to the group ID, using the plurality of transmission antennas.

The transmitting unit may additionally transmit information about a number of data streams that are assigned to the terminals included in the terminal groups, to the terminals, and transmit the assigned number of data streams to the terminals.

In response to a terminal joining the plurality of terminals in accessing the access point or a terminal included in the plurality of terminals no longer accessing the access point, the terminal group generation unit may update the terminal group.

In another aspect, there is provided a method of assigning a group identification (ID), the method including generating at least one terminal group in which a plurality of terminals located within a coverage area of the access point are aligned based on a sequence, calculating a conditional probability of a terminal being present in the sequence of the at least terminal group, with respect to each of the plurality of terminals, and assigning the plurality of terminals to a plurality of group IDs, based on the calculated conditional probability.

The group IDs may be included in a plurality of group ID sets, and a group ID set that has a greatest number of terminal groups from among the plurality of group ID sets may be assigned to the plurality of terminals.

The method may further comprise transmitting a group ID included in the assigned group ID set, to the terminals, and transmitting data to the terminals based on the group ID.

The transmitting of the data may comprise transmitting a plurality of data streams to terminals that are included in terminal groups corresponding to the group ID, using a plurality of transmission antennas.

The transmitting of a group ID may comprise additionally transmitting information about a number of data streams that are assigned to the terminals, to the terminals, and the transmitting of the data may comprise transmitting data streams corresponding to the number to the terminals.

The method may further comprise updating the terminal group in response to a terminal joining the plurality of terminals in accessing the access point or a terminal included in the plurality of terminals no longer accessing the access point.

In another aspect, there is provided a method of assigning a group identification (ID), the method including assigning a group ID set based on a maximum number of terminals capable of accessing an access point, assigning a first terminal to a group ID, included in the group ID set, in response to the first terminal accessing the access point, and transmitting information about the group ID to the first terminal and a second terminal that is included in the group ID.

In another aspect, there is provided a method of assigning a group identification (ID), the method including determining whether a terminal begins to access an access point, or whether a terminal from among terminals accessing the access point no longer accesses the access point, updating a terminal group including terminals accessing the access point, in response to a terminal beginning to access the access point, or in response to a terminal no longer accessing the access point, and assigning a group ID set based on the updated terminal group.

In another aspect, there is provided a method of assigning a group identification (ID), the method including classifying terminals accessing an access point into a first terminal group that comprises power sensitive terminals, and a second terminal group that comprises non-power sensitive terminals, assigning a group ID to the second terminal group, and transmitting the group ID by applying a group ID overloading scheme to the group ID.

In another aspect, there is provided a computer-readable storage medium having stored therein program instructions to cause a processor to implement a method including generating at least one terminal group in which a plurality of terminals located within a coverage area of the access point are aligned based on a sequence, calculating a conditional probability of a terminal being present in the sequence of the at least terminal group, with respect to each of the plurality of terminals, and assigning the plurality of terminals to a plurality of group IDs, based on the calculated conditional probability.

In another aspect, there is provided a terminal to receive data from an access point, the terminal including a receiver configured to receive, from the access point, a data stream comprising a group ID that identifies a group of terminals, from among a plurality of terminals included in a coverage area of the access point, wherein the group of terminals are to receive data from the access point, and a controller configured to deactivate the power of the receiver, in response to an ID corresponding to the terminal not being present in the group ID.

The data stream may comprise a Very High Throughput signal-A (VHT-SIG-A) field that comprises the group ID that identifies the group of terminals.

The VHT-SIG-A field may further comprise a stream index that identifies the number of data streams to be received by each terminal included in the group ID.

The plurality of terminals included in the coverage area of the access point may be greater in number than the number of terminals included in the group ID that identifies the group of terminals that are to receive data from the access point.

Each terminal included in the coverage area of the access point may be assigned a character, and the group ID may include the characters corresponding to the group of terminals that are to receive data from the access point.

Other features and aspects may be apparent from the following detailed description, the drawings, and the claims.

BRIEF DESCRIPTION OF THE DRAWINGS

FIG. 3 is a diagram illustrating an example of a terminal group that includes six terminals located within a coverage area of an access point.

FIGS. 4A and 4B are diagrams illustrating examples of expressing a group identification (ID) using one bit.

FIGS. 5A and 5B are diagrams illustrating an example of expressing a group ID using two bits.

Figure 1:
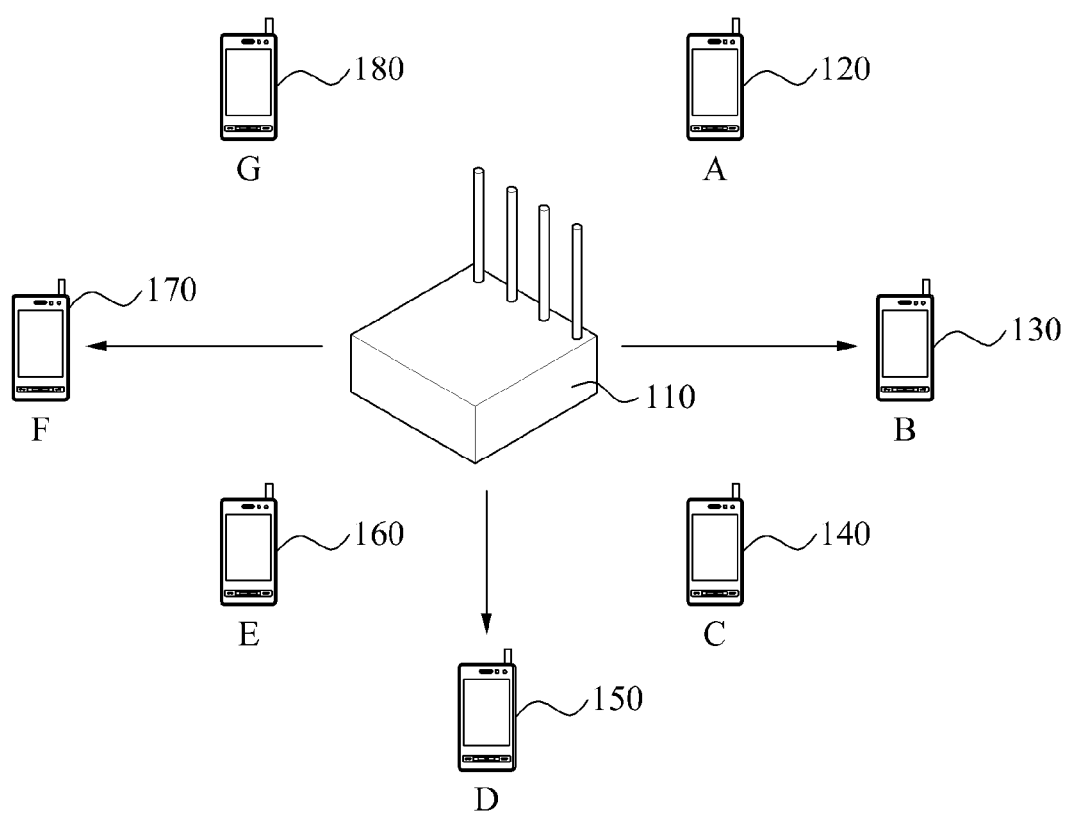
FIG. 1 is a diagram illustrating an example in which an access point transmits a data stream to a plurality of terminals.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, to description of well-known functions and constructions may be omitted for increased clarity and conciseness.

FIG. 1 illustrates an example in which an access point transmits a data stream to a plurality of terminals.

Referring to FIG. 1, access point 110 selects data receiving terminals 130, 150, and 170 to receive data from the access point 110, from among a plurality of terminals 120, 130, 140, 150, 160, 170, and 180 that are located within a coverage area of the access point 110. The access point 110 may transmit data to the data receiving terminals 130, 150, and 170.

For example, the access point 110 may simultaneously transmit a plurality of data streams to the data receiving terminals 130, 150, and 170, using a plurality of transmission antennas. In this example, the access point 110 may transmit information about the data receiving terminals 130, 150, and 170 to the plurality of terminals 120, 130, 140, 150, 160, 170, and 180. Terminals from among terminals 120, 130, 140, 150, 160, 170, and 180 that are not receiving data, may not receive data from the access point 110, and may deactivate a receiving unit. Accordingly, power consumption may be reduced.

Figure 2:
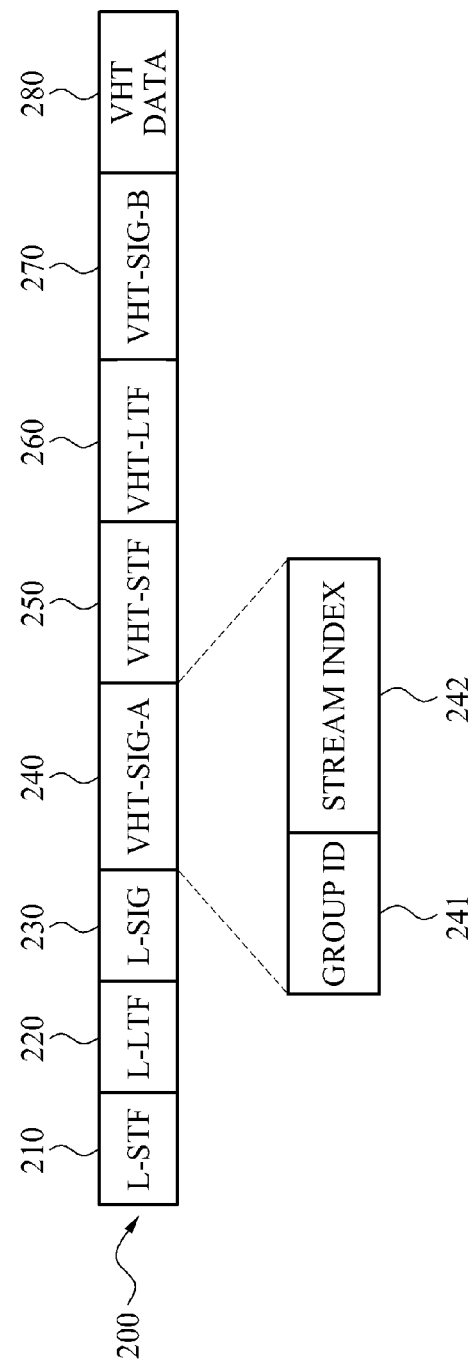
FIG. 2 is a diagram illustrating an example of a data stream that is transmitted by an access point.

FIG. 2 illustrates an example of a data stream that is transmitted by an access point.

Referring to FIG. 2, data stream 200 includes a Legacy Short Training Field (L-STF field) 210, a Legacy Long Training Field (L-LTF field) 220, a Legacy signal field (L-SIG field) 230, a Very High Throughput signal-A field (VHT-SIG-A field) 240, a Very High Throughput Short Training field (VHT-STF field) 250, a Very High Throughput Long Training Field (VHT-LTF field) 260, a Very High Throughput signal-B field (VHT-SIG-B) 270, and a Very High Throughput Data field (VHT-Data field) 280.

In this example, the L-STF field 210, the L-LTF field 220, and the L-SIG field 230 are areas for transmitting a control signal to a legacy terminal that does not support MU-MIMO. In this example, the VHT-SIG-A field 240, the VHT-STF field 250, the VHT-LTF field 260, and the VHT-SIG-B 270 are areas for transmitting a control signal to a terminal that supports MU-MIMO. The VHT-Data field 280 is an area for transmitting data to a terminal that supports MU-MIMO.

In various aspects, the access point may transmit information about a data receiving terminal using the VHT-SIG-A field 240. For example, the access point may transmit information that identifies the data receiving terminal using a group ID 241, and may transmit a number of data streams to be received by each data receiving terminal using a stream index 242.

As an example, the access point may transmit a data stream to a plurality of terminals, for example, to four data receiving terminals. In this example, the group ID 241 may include information that identifies the four data receiving terminals. The access point may generate a terminal group including four terminals from among a plurality of terminals. The access point may transmit an ID of the terminal group including data receiving terminals, as information that identifies a terminal If N terminals are located within a coverage area of the access point, a number of terminal groups generated by selecting four terminals from among the N terminals may be calculated to be $_NC_4$. If twenty terminals are located within the coverage area of the access point, the number of terminal groups may correspond to 4,845 different possible groups. In this example, 4,845 terminal group IDs may be used for identifying each terminal group, and a length of a terminal ID may be equal to or greater than 13 bits.

As another example, a length of information for identifying a terminal may be equal to or less than 6 bits. In this example, the access point may transmit information about multiple terminals using bits in a relatively short length, and may use a group ID overloading scheme for transmitting the information.

Hereinafter, an example a group ID assigning scheme of assigning a group ID and transmitting information about a terminal are described by operation.

Operation 1: Assign a sequence to each terminal.

An access point may align each terminal that is located within a coverage area based on a predetermined sequence. For example, the access point may assign characters such as A, B, C, D, and the like, to each terminal, and may align terminals based on an alphabetical order.

Operation 2: Generate a terminal group including terminals.

The access point may generate a terminal group including terminals. For example, the number of terminals included in the terminal group may correspond to a number of terminals to which the access point may simultaneously transmit data. For example, if the access point is capable of transmitting data to a maximum of four terminals, each terminal group may include four terminals.

As an example, six terminals may be located in a coverage of the access point. The six terminals may be assigned alphabetic characters A, B, C, D, E, F, respectively. In this example, there are fifteen possible terminal groups that include four terminals out of the six terminals. The fifteen terminal groups are illustrated as FIG. 3.

According to various examples, terminal groups may be aligned based on a sequence that is assigned to each terminal. Referring to FIG. 3, terminal A may be placed at a first position in a terminal group, and terminal F may be placed at a fourth position in any terminal group.

Operation 3: Calculate a conditional probability of each terminal being present at a position in each sequence of a terminal group.

Referring to the above-mentioned terminal groups, 10 terminal combinations may include terminal A from among the fifteen terminal combinations. Terminal A may be placed at the first position in any of the 10 terminal combinations. In this example, a probability that terminal A is placed at the first position may correspond to "1" and a probability that terminal A is placed at another position may correspond to "0".

In a similar scheme, 10 terminal combinations may include terminal B from among the fifteen terminal combinations. In the 10 terminal combinations, terminal B may be placed at the first position of the four terminal combinations, and terminal B may be placed at the second position of the six terminal combinations. Thus, a probability that terminal B is placed at the first position may correspond to 0.4, and a probability that terminal B is placed at the second position may correspond to 0.6.

For example, a probability that terminal S is placed at an $i^{th}$ position may correspond to $p_i(S)$, and a conditional probability that each terminal is placed at each position of terminal combinations may be calculated as following.

$p_1(A)=1, p_2(A)=0, p_3(A)=0, p_4(A)=0$ $p_1(B)=0.4, p_2(B)=0.6, p_3(B)=0, p_4(B)=0$ $p_1(C)=0.1, p_2(C)=0.6, p_3(C)=0.3, p_4(C)=0$ $p_1(D)=0, p_2(D)=0.3, p_3(D)=0.6, p_4(D)=0.1$ $p_1(E)=0, p_2(E)=0, p_3(E)=0.6, p_4(C)=0.4$ $p_1(F)=0, p_2(F)=0, p_3(F)=0, p_4(F)=1$

Operation 4: Generate a group ID set based on a calculated conditional probability.

A group ID set may include a plurality of group IDs. An example of operation 4 is described with reference to FIG. 4 and FIG. 5.

In operation 4, a terminal may be assigned to a group ID based on a calculated conditional probability. For example, if a calculated conditional probability is $P_2(B)=0.5$, the access point may select 50% of group IDs from among a plurality of group IDs, and may assign terminal B to the second position of a selected group ID.

As an example, if a total number of group IDs included in a group ID set is 64, the access point may select all group IDs that is included in the group ID set, and may assign data receiving terminal C to the 64 selected group IDs. If $P_2(C)$ of data receiving terminal C is 0.5, the access point may assign data receiving terminal C to 32 (64×0.5=32) group IDs, from among the 64 selected group IDs, to be placed at the second position.

As another example, if a total number of group IDs included in the group ID set is 64, the access point may select 32 group IDs to assign to data receiving terminal C. If $P_2(C)$ of data receiving terminal C is 0.5, the access point may assign data receiving terminal C to 16 (32×0.5=16) group IDs, from among the 32 selected group IDs, to be placed at the second position.

FIGS. 4A and 4B illustrate examples of expressing a group ID using one bit. If a group ID of only 1 bit is used, a group ID set may include two group IDs.

FIG. 4A illustrates a position in a group ID where a terminal may be placed, with respect to each terminal. In operation 3, a conditional probability $P_1(A)=1$ is calculated. In this example, terminal A may be placed at the first position in the first group ID and the second group ID. Referring to FIG. 4A, terminal A may be placed at the first position in both of a first group ID and a second group ID. In operation 3, conditional probabilities $P_1(B)=0.4$ and $P_2(B)=0.6$ are calculated.

Referring to the conditional probabilities, terminal B may be placed at the first position or the second position in a group ID. In the example illustrated in FIGS. 4A and 4B, terminal B may be placed at the first position in the first group ID, and placed at the second position in the second group ID. As another example, terminal C may be placed at the second position in the first group ID, and may be placed at a third position in the second group ID. As another example, terminal D may be placed at the second position in the first group ID, and may be placed at the third position in the second group ID. As another example, terminal E may be placed at the third position in the first group ID, and may be placed at a fourth position in the second group ID. As another example, terminal F may be placed at the fourth position in both of the first group ID and the second group ID.

FIG. 4B illustrates terminals that may be assigned at each position, with respect to each group ID. Referring to FIG. 4B, at the first position of the first group ID, terminal A or terminal B may be assigned. At the second position of the first group ID, terminal C or terminal D may be assigned. At the third position of the first group ID, terminal E may be assigned, and at the fourth position, terminal F may be assigned.

In this example, the first group ID corresponds to four terminal groups [ACEF], [ADEF], [BCEF], and [BDEF] from among terminal groups illustrated in FIG. 3. The second group ID corresponds to four terminal groups [ABLE], [ABCF], [ABDE], and [ABDF] from among terminal groups illustrated in FIG. 3. For example, the group ID sets illustrated in FIG. 4 correspond to eight terminal groups from among fifteen potential terminal groups.

FIGS. 5A and 5B illustrate examples of expressing a group ID using two bits. If a group ID is expressed using two bits, the group ID set may include four group IDs.

FIG. 5A illustrates a position in a group ID where a terminal may be placed, with respect to each terminal Referring to FIG. 5A, terminal A may be placed at the first position in any group ID. Terminal B may be placed at the second position in the first group ID and the fourth group ID, and may be placed at the first position in both the second group ID and the third group ID. In this example, terminal C may be placed at the third position in of the first group ID and the fourth group ID, and may be placed at the second position in the second group ID and the third group ID.

FIG. 5B illustrates a terminal that may be assigned at each position, with respect to each group ID. Referring to the first group ID of FIG. 5B, terminal A may be assigned at the first position, terminal B may be assigned at the second position, terminal C or terminal D may be assigned at the third position, and terminal E or terminal F may be assigned at the fourth position. In this example, the first group ID is represented by four terminal groups [ABLE], [ABCF], [ABDE], and [ABCF]. As another example, the second group ID may is represented by four terminal groups [ACDE], [ACDF], [BODE], and [BCDF], the third group ID corresponds to four terminal groups [ACEF], [ADEF], [BCEF], and [BDEF], and the fourth group ID corresponds to four terminal groups [ABDF], [ABEF], [ACDF], and [ACEF]. The group ID sets illustrated in FIG. 5 corresponds to thirteen terminal groups among fifteen terminal groups.

Operation 5: Assign a group ID, corresponding to a greatest number of terminal groups, from among group IDs In various aspects, the access point may generate a plurality of group ID sets, and may assign a group ID set, corresponding to a greatest number of terminal groups, from among the generated plurality of group ID sets. As described herein, the group ID sets illustrated in FIG. 4 may correspond to eight terminal groups. The access point may compare the group ID sets illustrated in FIG. 4 with a group ID set generated by another example, and may assign a group ID set corresponding to a greater number of terminal groups.

For example, the group ID sets illustrated in FIG. 5 may correspond to thirteen terminal groups. The access point may compare the group ID sets illustrated in FIG. 5 with a group ID set generated by another example, and may assign a group ID set corresponding to a greater number of terminal groups.

While the examples described herein provide expressing a group ID using one bit and two bits, it should be appreciated that the examples herein are not limited thereto. The group ID may be expressed using any desired amount of bits, for example, one bit, two bits, three bits, four bits, or more bits.

Figure 6:
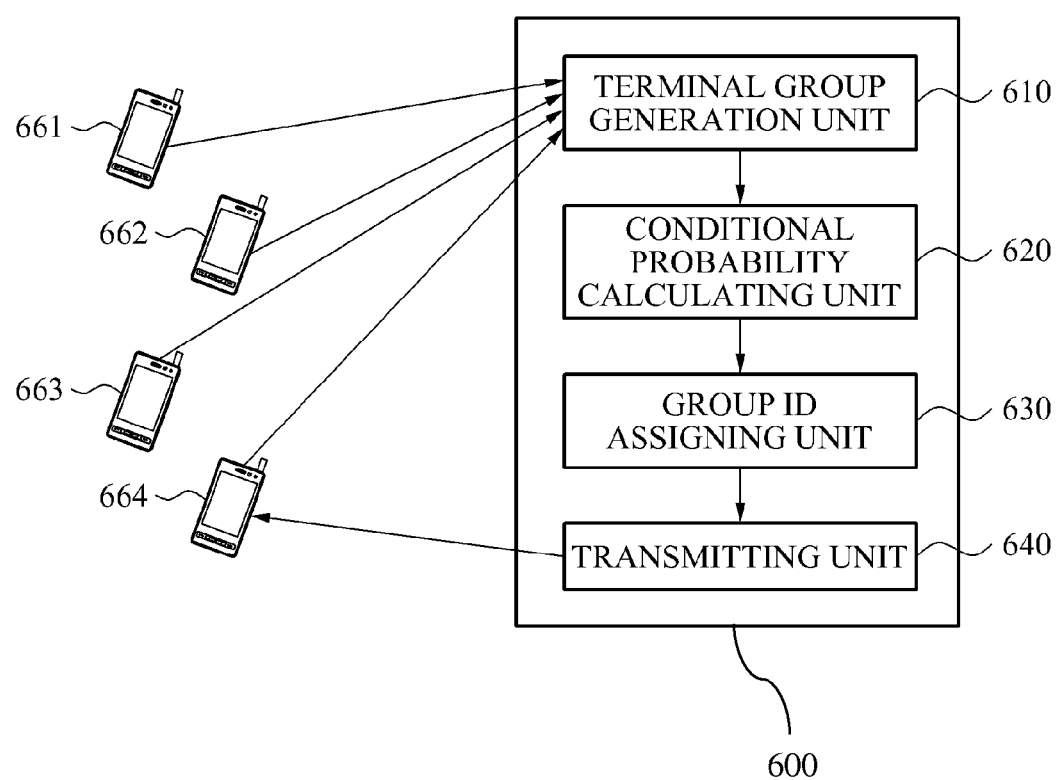
FIG. 6 is a diagram illustrating an example of an access point.

FIG. 6 illustrates an example of an access point.

Referring to FIG. 6, access point 600 includes a terminal group generation unit 610, a conditional probability calculating unit 620, a group ID assigning unit 630, and a transmitting unit 640.

For example, the terminal group generation unit 610 may generate a plurality of terminal groups including terminals 661, 662, 663, and 664 that are located within a coverage area of the access point 600. For example, each terminal group may include only a portion of the terminals from among the terminals 661, 662, 663, and 664.

The terminal group generation unit 610 may align terminals that are included in the terminal groups, based on a sequence. An example of terminal groups in which terminals are aligned is illustrated in FIG. 3.

The conditional probability calculating unit 620 may calculate a conditional probability that each of the terminals 661, 662, 663, and 664 is placed at each position of each terminal group. For example, the terminal group generation unit 610 may classify the terminals 661, 662, 663, and 664 into A, B, C, D, and the like. In this example, terminals that are included in the terminals groups are aligned in alphabetic order, and terminal A may be placed at the first position in any terminal group. In this example, the probability $P_1(A)$ that terminal A is placed at the first position may correspond to "1."

The group ID assigning unit 630 may assign each terminal to a group ID set, based on a calculated conditional probability. For example, the group ID set may correspond to a set of group IDs including a plurality of group IDs. A number of group IDs included in the group ID set may be determined based on a number of bits used for expressing a group ID. For example, if the group ID is expressed using one bit, the group ID set may include two group IDs. As another example, if the group ID is expressed using two bits, the group ID set may include four group IDs.

The group ID assigning unit 630 may assign each of the terminals 661, 662, 663, and 664 to the group ID. For example, the group ID assigning unit 630 may assign each of the terminals 661, 662, 663, and 664 to a portion of group IDs from among group IDs included in the group ID set. For example, if the group ID set includes 64 group IDs, the group ID assigning unit 630 may assign terminal A to 32 group IDs from among the 64 group IDs.

The group ID assigning unit 630 may assign a group ID to each terminal, based on the calculated conditional probability. For example, if a number of group IDs included in the group ID set corresponds to 64, the group ID assigning unit 630 may assign terminal B to 32 group IDs from among the 64 group IDs, and if $P_2(B)=0.5$, the group ID assigning unit 630 may assign terminal B to 16 (32×0.5=16) group IDs among the 32 group IDs, at the second position.

The group ID assigning unit 630 may generate a plurality of group ID sets, and may assign a group ID set that corresponds to a greatest number of terminal groups, from among the plurality of group ID sets. For example, the group ID sets illustrated in FIG. 4 corresponds to eight terminal groups among fifteen terminal groups, and the group ID sets illustrated in FIG. 5 corresponds to thirteen terminal groups from among fifteen terminal groups. The group ID assigning unit 630 may assign a group ID set, corresponding to a greatest number of terminal groups, from among the plurality of group ID sets that are expressed by the same number of bits.

The transmitting unit 640 may transmit the group ID that is included in the assigned group ID set, to the terminals 661, 662, 663, and 664. A terminal that is included in the group ID may correspond to a terminal that is capable of receiving data from an access point 600. For example, if the terminal is not included in the group ID, the terminal may not receive data from the access point, and thus, a data receiving unit may be deactivated, and power consumption may be reduced.

The transmitting unit 640 may transmit data to a terminal, based on the group ID. For example, the access point 600 may include a plurality of transmission antennas, and the transmitting unit 640 may transmit a plurality of data streams to a terminal included in a terminal group corresponding to the group ID. In this example, the transmitting unit 640 may additionally transmit information about a number of data streams that are assigned to terminals receiving data from the access point 600, to each terminal, and may transmit the data streams that are assigned to each terminal, to each terminal.

For example, the terminals 661, 662, 663, and 664 may be in motion and leave the coverage of the access point 600, and a new terminal may be included in the coverage of the access point 600. The group ID assigning unit 630 may generate a group ID set based on a maximum number of terminals that are capable of accessing the access point 600. In this example, if a new terminal is included in the coverage of the access point 600, the terminal group generation unit 610 may assign an alphabetic character to the newly included terminal According to various examples, if a new terminal is included in the coverage of the access point 600 to be added to the plurality of terminals 661, 662, 663, and 664, or a terminal that is included in the plurality of terminals 661, 662, 663, and 664, leaves the plurality of terminals 661, 662, 663, and 664, the group ID assigning unit 630 may update the terminal group. Accordingly, the group ID assigning unit 630 may assign the group ID set based on the updated terminal group.

Figure 7:
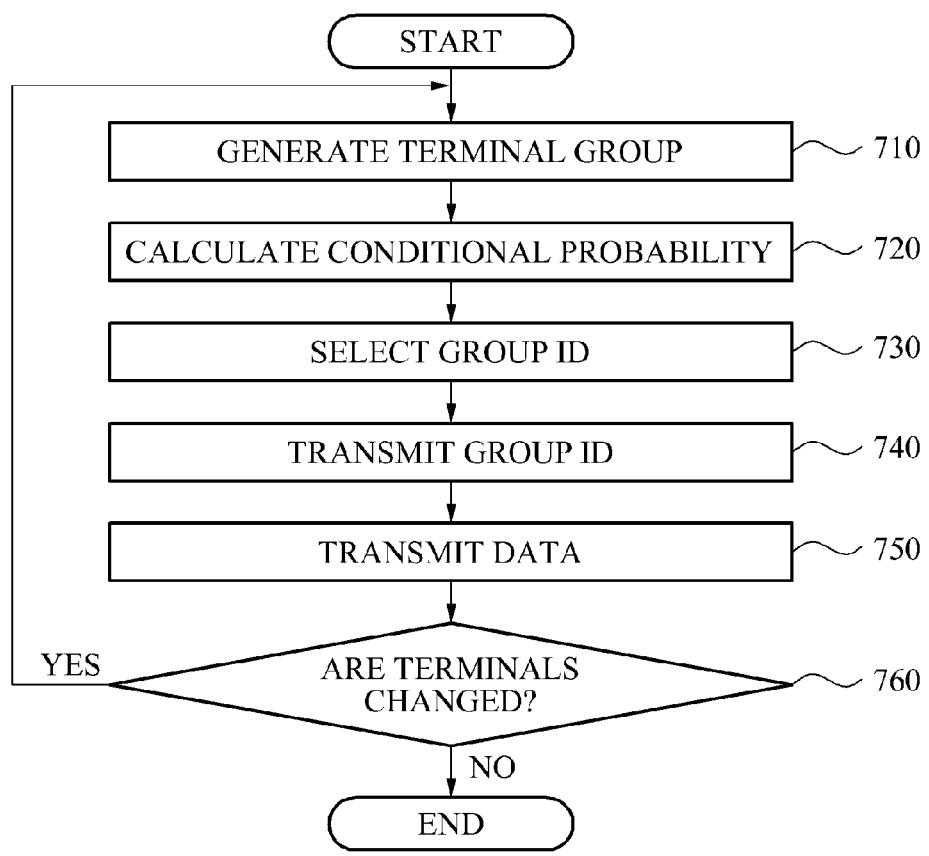
FIG. 7 is a flowchart illustrating an example of a method of assigning a group ID.

FIG. 7 illustrates an example of a method for assigning a group ID.

In 710, an access point generates a plurality of terminal groups including terminals that are located within a coverage of the access point. For example, the access point may align the terminals, included in the terminal groups, based on a predetermined sequence.

In 720, the access point calculates a conditional probability of a terminal being present in each sequence of each terminal group, with respect to each of the plurality of terminals.

In 730, the access point assigns each terminal to a group ID, based on the calculated conditional probability. The group ID set may correspond to a set of group IDs including a plurality of group IDs. For example, the access point may generate a plurality of group ID sets, and may assign a group ID set corresponding to a greatest number of terminal groups from among the plurality of group ID sets, to the terminals. The access point may assign a group ID set corresponding to a greatest number of terminal groups from among the plurality of group ID sets expressed by the same bits.

In operation 730, the access point may assign the group ID according to a power sensitivity of a terminal. For example, if N terminals access the access point, x terminals may be power sensitive from among the N terminals. In this example, the access point may classify terminals into a first terminal group including only power sensitive terminals and a second terminal group including only non-power sensitive terminals.

The access point may assign y group IDs, from among assignable M group IDs, to the second terminal group including only non-power sensitive terminals, and may assign M-y group IDs to the first terminal group including only power sensitive terminals.

The access point may not apply a group ID overloading scheme to M-y group IDs assigned to the first terminal group, and may apply the group ID overloading scheme to the y group IDs assigned to the second terminal group.

In 740, the access point transmits the group ID, included in the assigned group ID set, to a terminal. In 750, the access point transmits data to a terminal included in the group ID. A terminal that is not included in the group ID may correspond to a terminal that does not receive data from the access point, and thus, a data receiving unit of the terminal may be deactivated to reduce power consumption.

In various aspects, the access point may include a plurality of transmission antennas, and may transmit a plurality of data streams to a terminal included in the terminal group corresponding to the group ID. In this example, the access point may additionally transmit information about a number of data streams that are assigned to terminals receiving data from the access point, to each terminal, and may transmit data streams that are assigned to each terminal, to each terminal.

In 760, the access point determines whether terminals located in the coverage area have changed. If the terminals have changed, the access point updates the terminal group based on the changed terminals, in 710. In this example, the access point may assign the group ID, based on the terminal group updated based on one of a static scheme and a dynamic scheme described below. As another example, a hybrid scheme mixed with the static scheme and the dynamic scheme may be used.

Static Scheme

In a static scheme, the access point may previously assign a group ID set, based on a maximum number of terminals that are capable of accessing the access point. For example, if the maximum number of terminals that are capable of accessing the access point corresponds to ten, the access point may assign a predetermined alphabetic character to each of the ten terminals, and may generate a terminal group using the assigned alphabetic character, and thus, a group ID set may be assigned.

Because a number of terminals accessing the access point may be less than the maximum number of terminals, the access point may use only a portion of group IDs in a generated group ID set. If an additional terminal accesses the access point, the access point may assign a predetermined alphabetic character to the additionally accessing terminal. For example, the access point may assign the added terminal to a predetermined group ID, based on an alphabetic character assigned to the added terminal. The access point may transmit information about a group ID to which the added terminal is assigned, to the added terminal and the other terminals that are included in the group ID to which the added terminal is assigned.

Dynamic Scheme

In a dynamic scheme, each time an additional terminal accesses the access point or no longer accesses the access point, a group ID set may be newly generated. The access point may determine whether an additional terminal accesses, or whether a terminal leaves the access point, and may update information about terminals that are currently accessing the access point. For example, if information about terminals currently accessing the access point changes, the access point may update a terminal group including terminals accessing the access point, and may newly generate the group ID set based on the updated terminal group. The access point may assign the newly generated group ID set to the terminals, and may assign the newly assigned group ID set to a terminal.

Figure 8:
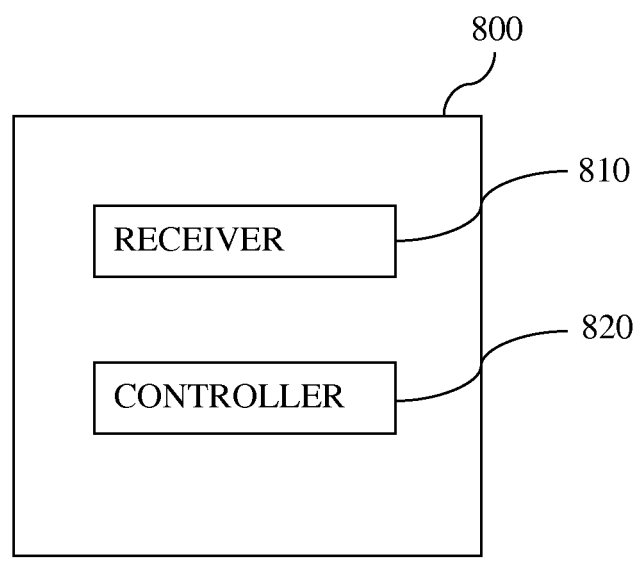
FIG. 8 is a diagram illustrating an example of a terminal.

FIG. 8 illustrates an example of a terminal.

Referring to FIG. 8, terminal 800 may receive data from an access point. In this example, the terminal 800 includes a receiver 810 to receive data and a controller 820. For example, the receiver 810 may receive, from the access point, a data stream comprising a group ID that identifies a group of terminals from among a plurality of terminals included in a coverage area of the access point which are to receive data from the access point.

The controller 820 may deactivate the power of the receiver 810, in response to an ID corresponding to the terminal 800 not being present in the group ID.

An example of the data stream that may be received by the receiver 810 is illustrated in FIG. 2. The data stream may comprise a Very High Throughput signal-A (VHT-SIG-A) field that comprises the group ID that identifies the group of terminals. The VHT-SIG-A field may further comprise a stream index that identifies the number of data streams to be received by each terminal included in the group ID.

The plurality of terminals included in the coverage area of the access point may be greater in number than the number of terminals included in the group ID that identifies the group of terminals that are to receive data from the access point.

For example, each terminal included in the coverage area of the access point may be assigned a character, and the group ID may include the characters corresponding to the group of terminals that are to receive data from the access point.

The examples described herein with reference to FIGS. 1-7 are also applicable to the example of the terminal 800 illustrated in FIG. 8. Further description thereof is omitted here for conciseness.

As described herein, when a plurality of terminals are located within a coverage area of an access point, the access point may select one or more terminals to receive data from the access point, from among the plurality of terminals. The access point may transmit information about a data receiving terminal to terminals. A terminal that is selected as the data receiving terminal may receive data from the access point, and a terminal that is not selected as the data receiving terminal may block power to reduce power consumption.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An access point comprising:
a terminal group generation unit to generate at least one terminal group in which a plurality of terminals located within a coverage area of the access point are aligned based on a sequence;
a conditional probability calculating unit to calculate a conditional probability that a terminal is present in the sequence of the at least one terminal group, with respect to each of the plurality of terminals; and
a group identification (ID) assigning unit to assign the plurality of terminals to a plurality of group IDs, based on the calculated conditional probability.

2. The access point of claim 1, wherein the group IDs are included in a plurality of group ID sets, and a group ID set that has a greatest number of terminal groups from among the plurality of group ID sets is assigned to the plurality of terminals.

3. The access point of claim 1, further comprising:
a transmitting unit to transmit a group ID included in the assigned group ID set, to the terminals, and to transmit data to the terminals based on the group ID.

4. The access point of claim 3, wherein:
the access point includes a plurality of transmission antennas, and
the transmitting unit transmits a plurality of data streams to terminals that are included in terminal groups corresponding to the group ID, using the plurality of transmission antennas.

5. The access point of claim 4, wherein the transmitting unit additionally transmits information about a number of data streams that are assigned to the terminals included in the terminal groups, to the terminals, and transmits the assigned number of data streams to the terminals.

6. The access point of claim 1, wherein, in response to a terminal joining the plurality of terminals in accessing the access point or a terminal included in the plurality of terminals no longer accessing the access point, the terminal group generation unit updates the terminal group.

7. The access point of claim 1, wherein the AP is further configured to select a terminal among the plurality of terminals to receive data from the access point, transmit information about the selected terminal to the plurality of terminals, and transmit the data to the selected terminal, wherein non-selected terminals of the plurality of terminals block power.

8. The access point of claim 7, wherein the non-selected terminals are configured to deactivate the selected terminal.

9. A method of assigning a group identification (ID), the method comprising:
generating at least one terminal group in which a plurality of terminals located within a coverage area of the access point are aligned based on a sequence;
calculating a conditional probability that a terminal is present in the sequence of the at least terminal group, with respect to each of the plurality of terminals; and
assigning the plurality of terminals to a plurality of group IDs, based on the calculated conditional probability.

10. The method of claim 9, wherein the group IDs are included in a plurality of group ID sets, and a group ID set that has a greatest number of terminal groups from among the plurality of group ID sets is assigned to the plurality of terminals.

11. The method of claim 9, further comprising:
transmitting a group ID included in the assigned group ID set, to the terminals; and
transmitting data to the terminals based on the group ID.

12. The method of claim 11, wherein:
the transmitting of a group ID comprises additionally transmitting information about a number of data streams that are assigned to the terminals, to the terminals; and
the transmitting of the data comprises transmitting data streams corresponding to the number to the terminals.

13. The method of claim 11, wherein the transmitting of the data comprises transmitting a plurality of data streams to terminals that are included in terminal groups corresponding to the group ID, using a plurality of transmission antennas.

14. The method of claim 9, further comprising:
updating the terminal group in response to a terminal joining the plurality of terminals in accessing the access point or a terminal included in the plurality of terminals no longer accessing the access point.

15. A method of assigning a group identification (ID), the method comprising:
assigning a group ID set based on a maximum number of terminals capable of accessing an access point;
assigning a first terminal to a group ID, included in the group ID set, in response to the first terminal accessing the access point; and
transmitting information about the group ID to the first terminal and a second terminal that is included in the group ID.

16. A method of assigning a group identification (ID), the method comprising:
determining whether a terminal begins to access an access point, or whether a terminal from among terminals accessing the access point no longer accesses the access point;
updating a terminal group including terminals accessing the access point, in response to a terminal beginning to access the access point, or in response to a terminal no longer accessing the access point; and
assigning a group ID set based on the updated terminal group.

17. A method of assigning a group identification (ID), the method comprising:
classifying terminals accessing an access point into a first terminal group comprising power sensitive terminals, and a second terminal group comprising non-power sensitive terminals;
assigning a group ID to the second terminal group; and
transmitting the group ID by applying a group ID overloading scheme to the group ID.

18. A non-transitory computer-readable storage medium having stored therein program instructions to cause a processor to implement a method comprising:
generating at least one terminal group in which a plurality of terminals located within a coverage area of the access point are aligned based on a sequence;
calculating a conditional probability that a terminal is present in the sequence of the at least terminal group, with respect to each of the plurality of terminals; and
assigning the plurality of terminals to a plurality of group IDs, based on the calculated conditional probability.

* * * * *